US007668720B2

(12) United States Patent
Seifert et al.

(10) Patent No.: US 7,668,720 B2
(45) Date of Patent: Feb. 23, 2010

(54) METHODOLOGY FOR VOICE ENABLING APPLICATIONS

(75) Inventors: David H. Seifert, Long Beach, CA (US); William F. Sherman, Lake Forest, CA (US); William J. Arthur, San Juan, CA (US)

(73) Assignee: Vangard Voice Systems, Inc., Irvine, CA (US)

( * ) Notice: Subject to any disclaimer, the term of this patent is extended or adjusted under 35 U.S.C. 154(b) by 220 days.

(21) Appl. No.: 11/064,759

(22) Filed: Feb. 22, 2005

(65) Prior Publication Data
US 2006/0167697 A1    Jul. 27, 2006

Related U.S. Application Data

(60) Provisional application No. 60/546,691, filed on Feb. 20, 2004.

(51) Int. Cl.
*G10L 21/00* (2006.01)
(52) U.S. Cl. .................. 704/275; 704/246; 704/251
(58) Field of Classification Search .................. 704/275
See application file for complete search history.

(56) References Cited

U.S. PATENT DOCUMENTS

| | | | |
|---|---|---|---|
| 6,185,535 B1 * | 2/2001 | Hedin et al. | 704/270 |
| 6,456,972 B1 * | 9/2002 | Gladstein et al. | 704/257 |
| 6,513,006 B2 * | 1/2003 | Howard et al. | 704/257 |
| 7,139,713 B2 * | 11/2006 | Falcon et al. | 704/270 |
| 7,177,814 B2 * | 2/2007 | Gong et al. | 704/270.1 |
| 7,188,066 B2 * | 3/2007 | Falcon et al. | 704/275 |

* cited by examiner

*Primary Examiner*—Richemond Dorvil
*Assistant Examiner*—Leonard Saint Cyr
(74) *Attorney, Agent, or Firm*—Blakely, Sokoloff, Taylor & Zafman LLP

(57) ABSTRACT

Methodology for voice-enabling an application minimizes code add-ons or code insertions. As an example, in applications used by a plurality of remote devices, the method may include dividing a master wordlist associated with the application into a plurality of wordlists respectively associated with the plurality of remote devices, and then converting the plurality of wordlists to a plurality of grammar lists respectively associated with the plurality of remote devices. Accordingly, the methodology voice enables applications with minimal alteration of the code of the applications.

3 Claims, 5 Drawing Sheets

METHODOLOGY FOR VOICE ENABLING APPLICATIONS

CROSS REFERENCE TO RELATED APPLICATION

The present application claims priority on U.S. Provisional Application for Patent Ser. No. 60/546,691 filed on Feb. 20, 2004, the entire disclosure of which is incorporated herein by reference.

BACKGROUND OF THE INVENTION

The present invention relates in general to computer systems and associated software applications. The invention relates more particularly to methods and apparatus for configuring applications to be voice enabled for use by remote devices such as PDAs and computers.

Conventional methods for voice enabling software applications require amending the actual code of the application or adding code to the application so that the application is voice enabled. This is an intensive process requiring substantial manpower and time and is, therefore, expensive. Further, each application needs to be voice enabled individually. The added code then controls the operation of the speech recognizer and interprets the recognizer's outputs. Generation of the code added to the application is a tedious and time-consuming task that must be re-done for each application and for each change to an application. Success at this task requires a programmer who is familiar with both the application and experienced in voice-enabling.

In view of the foregoing, there is a need in the art for a system and methodology for enhancing voice enabling of applications.

SUMMARY OF THE INVENTION

The invention provides methodology for voice-enabling applications that minimizes the amending the code of the applications themselves.

According to one aspect of the invention, a method for voice-enabling an application for use by a plurality of remote devices includes dividing a master wordlist associated with the application into a plurality of wordlists respectively associated with the plurality of remote devices, and then converting the plurality of wordlists to a plurality of grammar lists respectively associated with the plurality of remote devices. The plurality of grammar lists may then be pushed to the plurality of remote devices.

According to another aspect of the invention, a method for voice-enabling an application includes creating a speech object for the application, identifying an application element for voice-enabling, describing a property of the application element, and placing an identification and a description of the property in the speech object, with the speech object being associated with the application. These steps may be repeated a plurality of times for a plurality of application elements. In addition, the speech object may be packaged by attaching wordlist files and action files.

According to still another aspect of the invention, a voice-enabling method for an application having a speech object with a plurality of elements includes receiving an indication from the application that an element has been activated. Up receipt, the element may be associated with the speech object of the application to determine an action. A speech system may then be initialized to perform the action indicated by the element, and a speech recognizer may be started upon receiving a request from the application. The result of the speech recognizer may then be transformed into the action as indicated by the element, with the action being passed on to the application for appropriate action.

According to a further aspect of the invention, a method for voice-enabling an application associated with a target recognizer and a rules interpreter may including providing a recognition grammar that is unrelated to an actual grammar compiler language, and then compiling a plurality of words from the recognition grammar that are associated with the target recognizer, and compiling a plurality of actions from the recognition grammar that are associated with the rules interpreter. The plurality of words may then be linked with the plurality of actions, respectively.

Other features and advantages of the present invention will become apparent to those skilled in the art from a consideration of the following detailed description taken in conjunction with the accompanying drawings.

DETAILED DESCRIPTION OF THE INVENTION

Figure 1:
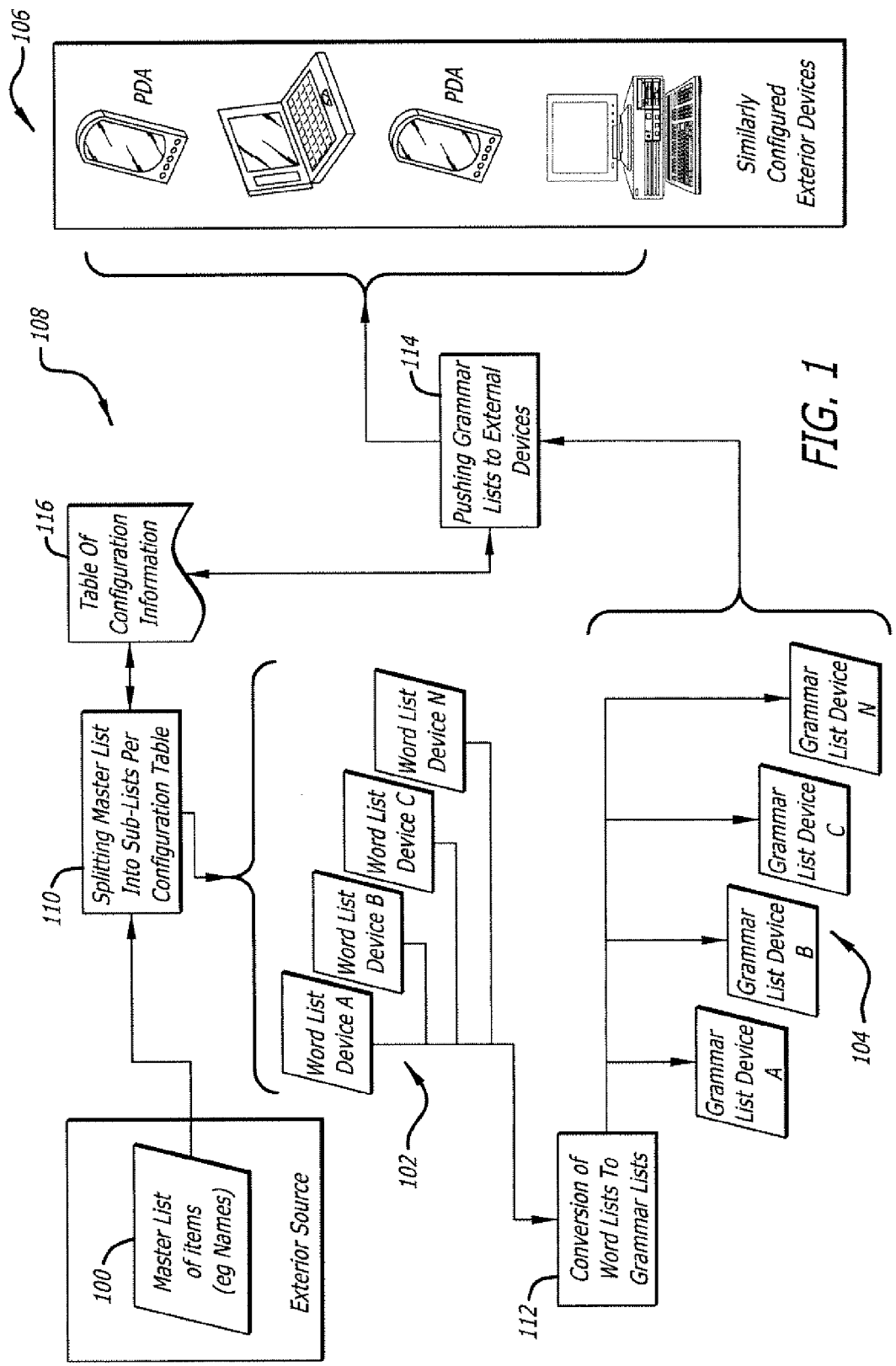
FIG. 1 illustrates methodology for subdividing a master wordlist into a plurality of divided wordlists and for generating grammars from the divided wordlists for list-based speech recognizers in remote devices.

Referring more particularly to the drawings, FIG. 1 illustrates methodology for subdividing a master wordlist 100 into a plurality of divided wordlists 102 of devices A, B, C, . . . , N according to some of the embodiments of the invention. FIG. 1 also illustrates methodology for generating grammars 104 from the divided wordlists 102 for list-based speech recognizers in devices 106 remote or external to the dividing entity according to other embodiments of the invention.

In a number of embodiments, it may be desirable to have many similarly configured exterior or remote devices 106 (such as PDAs, portable computers, desktop computers, and so on) in an enterprise environment (such as a corporation, a factory, a hospital, a governmental organization, and so on). Each remote device 106 may have list-based speech recognition capabilities, with each of these devices requiring the ability to recognize words or collections of words from the lists 102.

For example, the lists 102 may include names or inventory items local to the device 106, which lists may change periodically. Further, the lists 102 may be derived from one or more master wordlists 100 provided by the enterprise. For example, the master wordlist 100 may be a master patient list in a hospital embodiment or a master inventory list in a production embodiment.

In other embodiments, the speech-recognition capability of the remote devices 106 may require that the items of the lists 102 be rendered into an expression suitable for operation by the devices. For the purposes of this description, these expressions are referred to as "grammars" and indicated as grammar lists 104 of device A, B, C, . . . , N. Prior to the present invention, it was not possible to parse a master wordlist 100 into the sub-lists 102 and then to render the sub-lists 102 into grammars 104 suitable for the operation of a list-based speech recognizer.

According to some of the embodiments, a system 108 may build and store the dispersible wordlists 102 and may then distribute the wordlists 102 to a plurality of similarly configured devices 106 so that each device may has a predictable configured wordlist at runtime. The distribution of the wordlists 102 may be either accomplished by "pushing" the wordlists 102 to the devices 106 as shown at 114 or, alternatively, by "pulling" the wordlists 102 by the devices 106.

In a number of embodiments, an external entity such as an enterprise IT department, may generate or provide new master wordlist 100, which may then be divided according to rules provided by enterprise system (see 110) into a plurality of subsets 102. The subsets 102 may then be automatically converted (see 112) into grammars 104 for a speech recognizer. The dynamically created grammars 104 may then be pushed (see 116) to the remote devices 106 according to configuration information 116.

Figure 2:
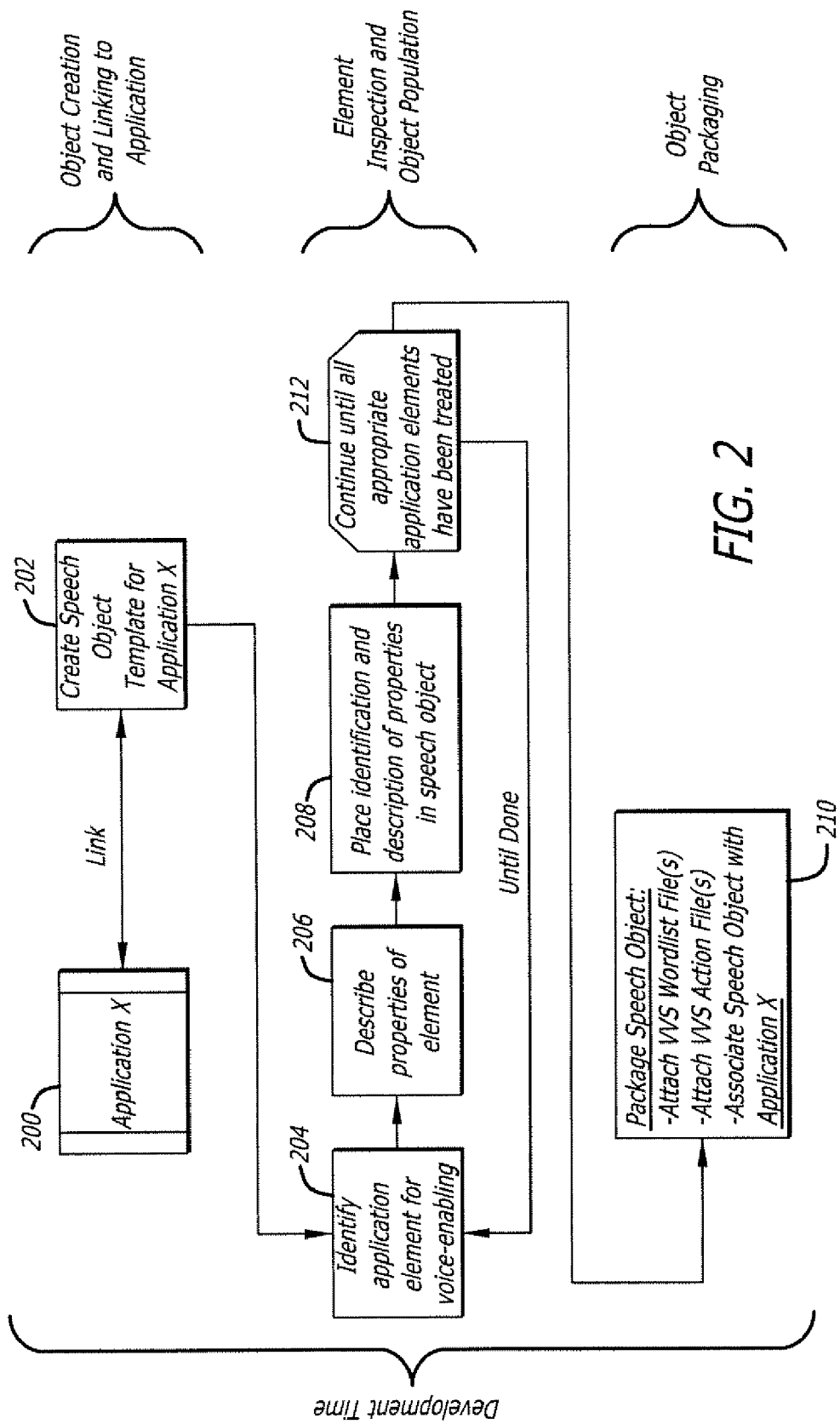
FIG. 2 illustrates methodology for voice enabling an application.

Referring to FIG. 2, methodology for voice enabling an application is illustrated according to a number of embodiments. As mentioned above, conventional approaches to voice enabling applications requires substantial addition of in-line or attached code. According to the invention, objects are produced and logically attached to applications. More specifically, in many of the embodiments to voice enable an application 200, during development time, the method may create a speech object template for the application (see 202) creating objects and linking the objects to the application. Thereafter, the method may then perform element inspection and object population by identifying a first of a plurality of application elements for voice enabling (see 204), describing the properties of the identified application element (see 206), and placing identification and description of the properties in a speech object (see 208). This process may continue (see 212) until all appropriate elements of the application 200 have been treated. Thereafter, the speech objects may be packaged (see 210) by attaching wordlist or data files, attaching action files, and associating speech object with the application 200.

Figure 3:
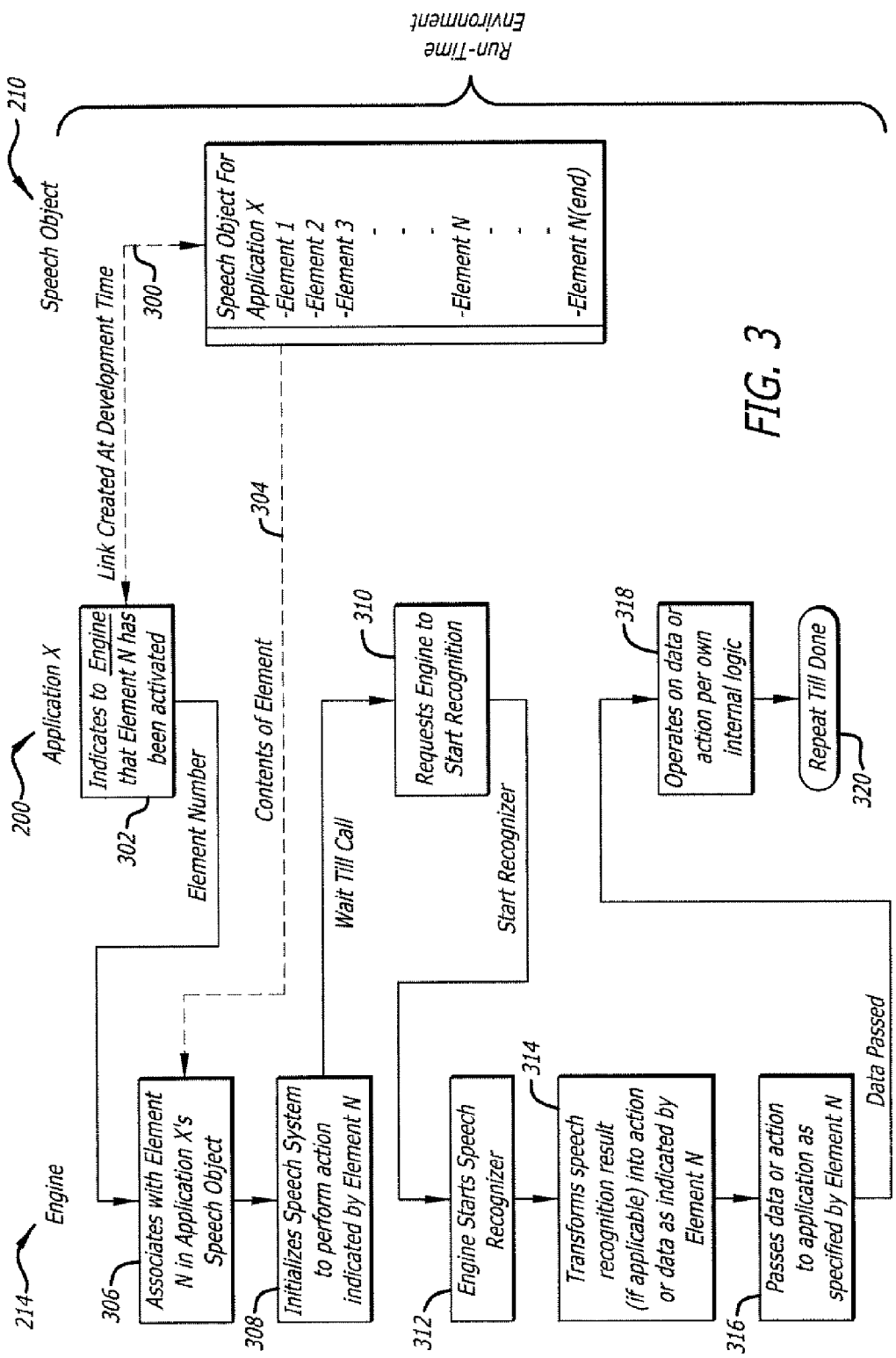
FIG. 3 illustrates methodology for operating a voice-enabled application.

As shown in FIG. 3, an engine 214 of the invention develops and builds into objects the representations of the application 200. The engine 214 then logically attaches the representation objects to existing application code. The application code is accordingly, provided with the means to create the minimal linkage between user activity and a runtime object manager which facilitates result production.

For example, within a run-time environment, a speech object 210 for the application 200 may include a plurality of Elements 1, 2, 3, . . . , N(end). A link (see 300) between the speech object 210 and the application 200 may be created at the development time. The application 200 may then indicate to the engine 214 that an Element N has been activated (see 302), with the contents of Element N being accessed by the engine 214 (see 304). The engine 214 may then associate with Element N in the speech object 210 of the application 200 (see 306).

The engine 214 may then initialize a speech system to perform the action indicated by Element N (see 308). When the application 200 requests the engine 214 to start recognition (see 310), the engine 214 then starts the speech recognizer (see 312). Thereafter, the engine 214 may transform the speech recognition result, if applicable, into either an action or data as indicated by Element N (see 314). The engine 214 may then pass the data or the action to the application 200 as specified by Element N (see 316). The application 200 may then operate on the data or the action according to its own internal logic (see 318). This process may then be repeated a plurality of times (see 320).

Figure 4:
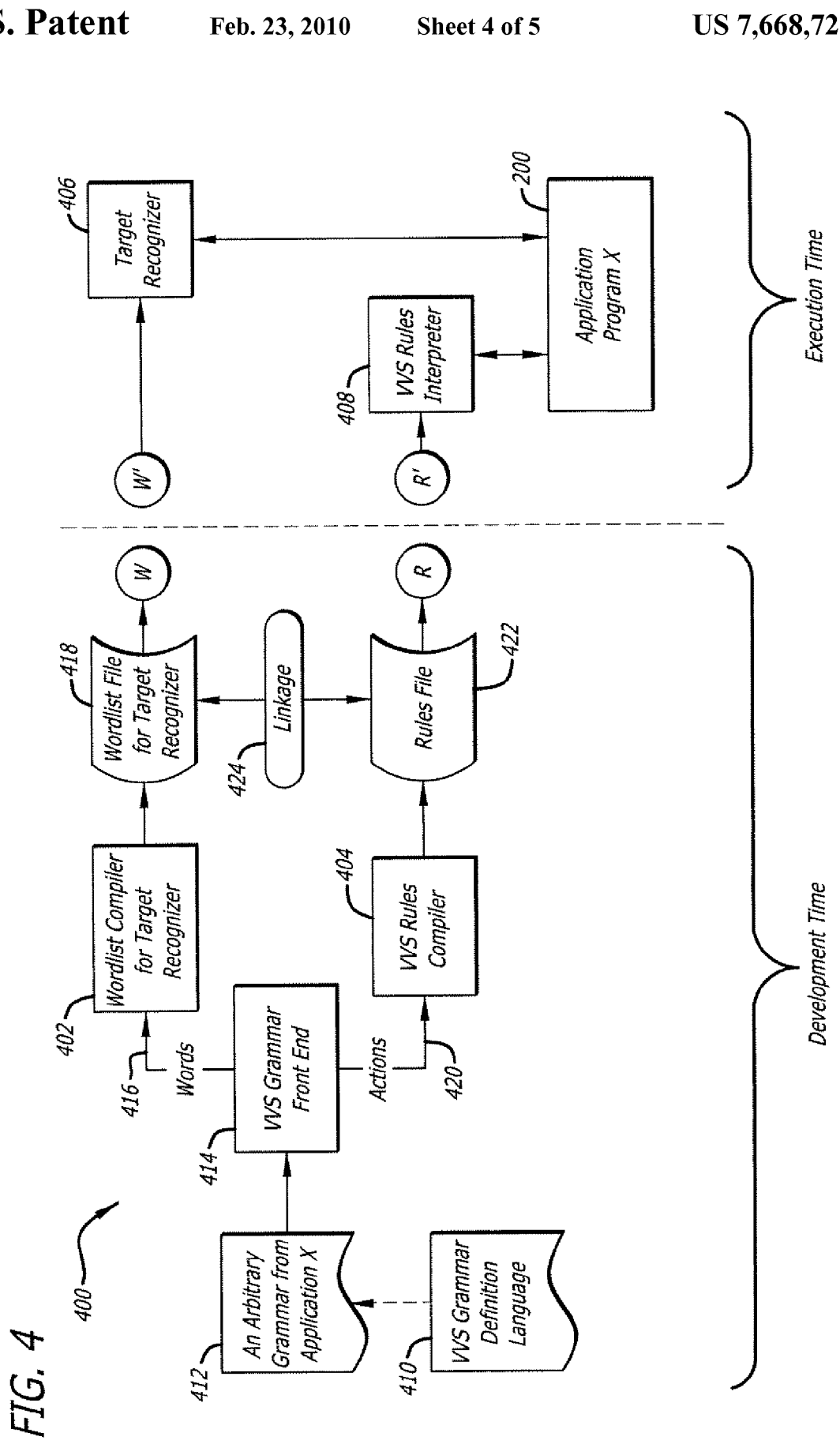
FIG. 4 illustrates methodology for expressing and actualizing grammars for speech recognition systems.

FIG. 4 illustrates methodology for expressing and actualizing grammars for voice-recognitions systems. A list-based speech recognizer system 400 may include a wordlist compiler 402 and a rules compiler 404 at development time, and may include a target recognizer 406 and a rules interpreter 408 at run time. Grammars enable list-based speech recognizers to perform meaningful functions in complex application environments. Grammars may include wordlists and rules. Rules specify what action should be taken upon recognition of a given word or set of words in a wordlist. Grammars are written in a definition language specified by the compiler vendor. Many conventional grammar definition languages, compilers, and associated recognizers cannot specify or actualize complex semantic expressions. Accordingly, the invention provides methodology for permitting complex semantic expressions to be specified and actualized with any list-based speech recognizer system.

According to a number of embodiments, starting with a grammar definition language 410, an arbitrarily grammar 412 from the application 200 may be expressed in a manner not tied or unrelated to any specific actual grammar compiler language. Thereafter, from a grammar front end 414, words (see 416) may be compiled by the wordlist compiler 402 for the target recognizer 406. When compiled, the wordlists may be stored in a file 418 for the target recognizer. In addition, actions (see 420) may be compiled by a rules compiler 404 and then provided to a rules file 422. The compiled wordlist and the compiled actions may then be linked (see 424) between the files 418 and 422. Accordingly, the actions 420 are encoded in a representational notation linked to a speech recognition system that is not able to convey such actions. The representational notation may then interpret by the rules interpreter 408 so as to produce the desired encoded action from speech recognition outputs.

Figure 5:
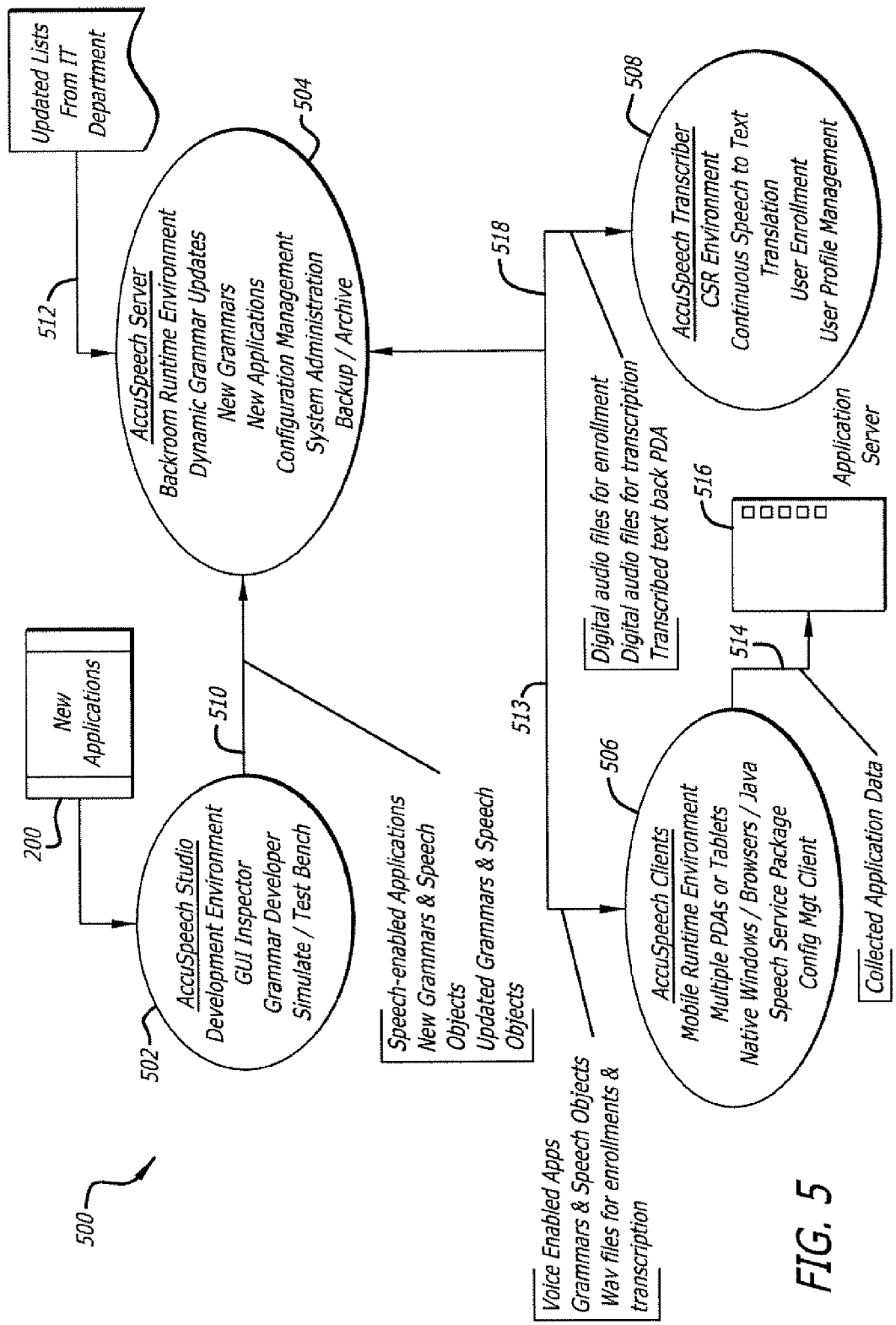
FIG. 5 illustrates a system for voice-enabling applications.

With reference to FIG. 5, a system 500 for implementing the methodology of the invention may include a speech studio 502, a speech server 504, one or more speech clients 506, and a speech transcriber 508. New applications 200 may be voice enabled by the speech studio 502 in the development environment, which may entail a graphical user interface (GUI) inspector, a grammar developer, and a simulator. The speech studio 502 may then provide the speech server 504 speech-enabled applications, new grammars and speech objects, and updated grammars and speech objects (see 510). Based on these inputs, the speech server 504 may perform dynamic grammar updates, including receiving updated wordlists from an IT department (see 512). The speech server 504 may also perform configuration management, system administration, and backup and archiving functions.

The speech clients 506 may communicate with the speech server 504 with regard to voice-enabled applications, grammars and speech objects, and audio files for enrollment and transcription (see 513). The speech clients 506 operate in a mobile runtime environment in a plurality of PDAs or tablets or in native Windows, browsers, or Java applications. The clients 506 may operate speech service packages and may communicate application data (see 514) with an application server 516.

The speech transcriber 508 may operate in a CSR environment to perform continuous speech to text translation. The transcriber 508 may also perform user enrollment and user profile management functions. Accordingly, audio enrollment and transcription files may be communicated with the speech server 504 to perform these functions.

Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A method for voice-enabling an application, comprising:
   functionally associating the application with a speech object, the speech object comprises an association between an application element of the application and both (a) a word or language utterance and (b) a function call, by;
   performing element inspection and object population by identifying the application element for voice enabling;
   describing properties of the application element, and
   placing the identification and description of the properties in the speech object;
   configuring a recognizer system and an interpreter using a specific grammar definition language supporting semantic expressions that integrate the word or language utterance with a rule as to what action is to be taken upon recognition of the word or language utterance;
   recognizing and processing the word utterance or language utterance by the recognizer system using the specific grammar definition language; and
   mapping the word or language utterance by the interpreter using the specific grammar definition language into the function call that controls the application element in the application.

2. The method of claim 1 wherein the function call is communicated as data or action as specified by the application element.

3. The method of claim 1 wherein the grammar definition language associates words or language utterances with function call.

* * * * *

UNITED STATES PATENT AND TRADEMARK OFFICE
CERTIFICATE OF CORRECTION

| | | |
|---|---|---|
| PATENT NO. | : 7,668,720 B2 | Page 1 of 1 |
| APPLICATION NO. | : 11/064759 | |
| DATED | : February 23, 2010 | |
| INVENTOR(S) | : Seifert et al. | |

It is certified that error appears in the above-identified patent and that said Letters Patent is hereby corrected as shown below:

In column 5, at line 14, please delete, "by;" and insert -- by: --.

In column 5, at line 16, please delete, ";" and insert -- , --.

In column 6, at line 6, please delete, "utterance".

Signed and Sealed this
Twenty-ninth Day of March, 2011

David J. Kappos
*Director of the United States Patent and Trademark Office*